United States Patent
Kim et al.

(10) Patent No.: US 9,124,791 B2
(45) Date of Patent: Sep. 1, 2015

(54) IMAGE SENSOR MODULE AND IMAGE PROCESSING SYSTEM INCLUDING THE SAME

(71) Applicant: SK hynix Inc., Gyeonggi-do (KR)

(72) Inventors: Sang-Sik Kim, Gyeonggi-do (KR); Young-Man Suh, Gyeonggi-do (KR); Su-Eon Hwang, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/106,806

(22) Filed: Dec. 15, 2013

(65) Prior Publication Data

US 2015/0070568 A1 Mar. 12, 2015

(30) Foreign Application Priority Data

Sep. 10, 2013 (KR) ........................ 10-2013-0108375

(51) Int. Cl.
*H04N 5/225* (2006.01)
*G02B 5/20* (2006.01)

(52) U.S. Cl.
CPC ............... *H04N 5/2254* (2013.01); *G02B 5/20* (2013.01)

(58) Field of Classification Search
CPC .................................................... H04N 5/2254
USPC ........................................................... 348/340
See application file for complete search history.

(56) References Cited

U.S. PATENT DOCUMENTS

2012/0057066 A1* 3/2012 Kawai ........................... 348/340
2012/0068292 A1   3/2012 Ikeda et al.

* cited by examiner

*Primary Examiner* — Tuan Ho
(74) *Attorney, Agent, or Firm* — IP & T Group LLP

(57) ABSTRACT

An image sensor module has a filler of a low refractive index and thus prevents deterioration of image quality due to a flare and a ghost image. The image sensor module includes an image sensor, a housing covering the image sensor, a filter coupled to the housing and disposed on the image sensor, and a filler filled in between the image sensor and the filter inside the housing and having a refractive index that is less than a refractive index of the filter.

9 Claims, 5 Drawing Sheets

IMAGE SENSOR MODULE AND IMAGE PROCESSING SYSTEM INCLUDING THE SAME

CROSS-REFERENCE TO RELATED APPLICATIONS

The present application claims priority of Korean Patent Application No. 10-2013-0108375, filed on Sep. 10, 2013, which is incorporated herein by reference in its entirety.

BACKGROUND

1. Field

Exemplary embodiments of the present invention relate to a semiconductor device manufacturing technology, and more particularly, to an image sensor module and an image processing system including the same.

2. Description of the Related Art

An image sensor converts an optical signal, which includes information on an image of a subject, and a distance or depth thereto, into an electrical signal. An image sensor module including the image sensor may have a housing for sealing the image sensor and a filter coupled to the housing and filtering a specific element of an incident light flowing into the image sensor.

A typical image sensor module may have a deteriorated image quality because of phenomena, such as a flare and a ghost image that occur by a diffused reflection between the image sensor and the filter.

SUMMARY

An exemplary embodiment of the present invention is directed to an image sensor module that is capable of preventing deterioration of image quality and an image processing system including the same.

In accordance with an exemplary embodiment of the present invention, an image sensor module may include an image sensor, a housing covering the image sensor, a filter coupled to the housing and disposed on the image sensor, and a filler filled in between the image sensor and the filter inside the housing and having a refractive index that is less than a refractive index of the filter.

In accordance with an exemplary embodiment of the present invention, an image processing system may include an image sensor module, a processor suitable for controlling an operation of the image sensor module, a memory device suitable for storing data for the operation, a storage device suitable for storing data for the operation and communication with an external device and retaining stored data regardless of a power supply, an input/output device suitable for performing the communication with the external device, a power supply device suitable for providing an operation voltage for the power supply, wherein the image sensor module includes a filter suitable for filtering a light signal, an image sensor suitable for converting the filtered light signal into an electrical signal, and a filler filled in between the image sensor and the filter and having a refractive index less than a refractive index of the filter.

In accordance with an exemplary embodiment of the present invention, an image sensor module may include a lens suitable for concentrating a light signal, a filter suitable for filtering the concentrated light signal, an image sensor suitable for converting the filtered light signal into an electrical signal, and a filler filled in between the image sensor and the filter and having a refractive index less than a refractive index of the filter.

According to the exemplary embodiments of the present invention, an image sensor module may have a filler of a low refractive index and thus prevent deterioration of image quality due to a flare and a ghost image.

DETAILED DESCRIPTION

Figure 1:
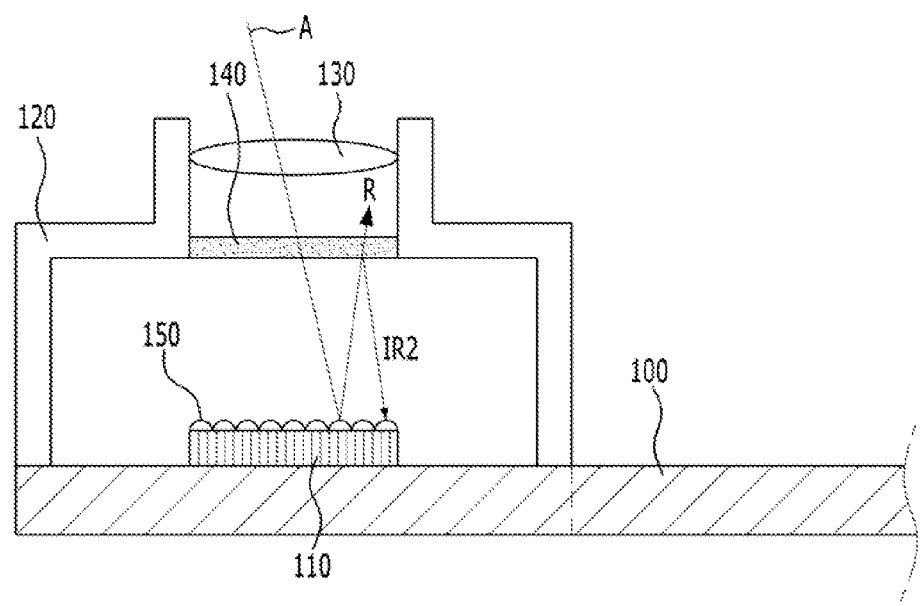
FIG. 1 is a block diagram illustrating an image sensor module according to a comparative example.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete and will fully convey the scope of the present invention to those skilled in the art. The drawings are not necessarily to scale and in some instances, proportions may have been exaggerated in order to clearly illustrate features of the embodiments. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence. It should be readily understood that the meaning of "on" and "over" in the present disclosure is interpreted in the broadest manner such that "on" means not only "directly on" but also on something with an intermediate feature(s) or a layer(s) therebetween, and that "over" means not only directly on top but also on top of something with an intermediate feature(s) or a layer(s) therebetween. When a first layer is referred to as being "on" a second layer or "on" a substrate, it not only refers to a case where the first layer is formed directly on the second layer or the substrate but also a case where a third layer exists between the first layer and the second layer or the substrate.

Various embodiments of the present invention provide an image sensor module that is capable of preventing deterioration of image quality. For this object, various embodiments of the present invention provide an image sensor module having a material film disposed between a filter and an image sensor and suitable for suppressing a diffused reflection that is generated between the filter and the image sensor and causes the deterioration of image quality.

Before describing an image sensor module in accordance with various embodiments of the present invention, deterioration of image quality due to the diffused reflection that is generated between the filter and the image sensor is described with reference to FIG. 1 illustrating an image sensor module according to a comparative example.

FIG. 1 is a block diagram illustrating the image sensor module according to the comparative example.

Referring to FIG. 1, the image sensor module according to the comparative example has a supporting substrate 100, an image sensor 110, a housing 120, a lens 130, and a filter 140.

The image sensor 110 is mounted on the supporting substrate 100. The image sensor 110 includes thereon a micro lens 150 for concentrating light. The housing 120 fixes elements disposed in the image sensor module and protects them from an external. For example, the micro lens 150, filter 140 and image sensor 110 are disposed so that the image sensor 110 may collect a light from a subject.

The lens 130 concentrates an incident light coming to the image sensor module into the image sensor 110. The filter 140 is disposed under the lens 130 and filters infrared rays from the incident light concentrated into the image sensor 110.

Incident light coming from the external of the image sensor module pass through the lens 130 and the filter 140 and is reflected on a surface of the image sensor 110. This is because a surface reflection is great due to a great refractive index difference between the micro lens 150, which is disposed on the image sensor 110 and concentrates light, and air contacting the micro lens 150.

Reflected light R formed by such way as described above returns to the lens 130. However, part of the reflected light is reflected and comes to the image sensor 110 again as retro-reflective light IR2. Especially, the retro-reflective light IR2 approaching a side of the image sensor 110 causes the flare and the ghost image effects on a sensed image.

According to such reason, unintended reflection of light causes the flare and the ghost image effects, and thus deteriorates the image quality.

From now on, an image sensor module capable of preventing the deterioration of the image quality due to the diffused reflection in accordance with an embodiment of the present invention is described in detail with reference to FIG. 2.

Figure 2:
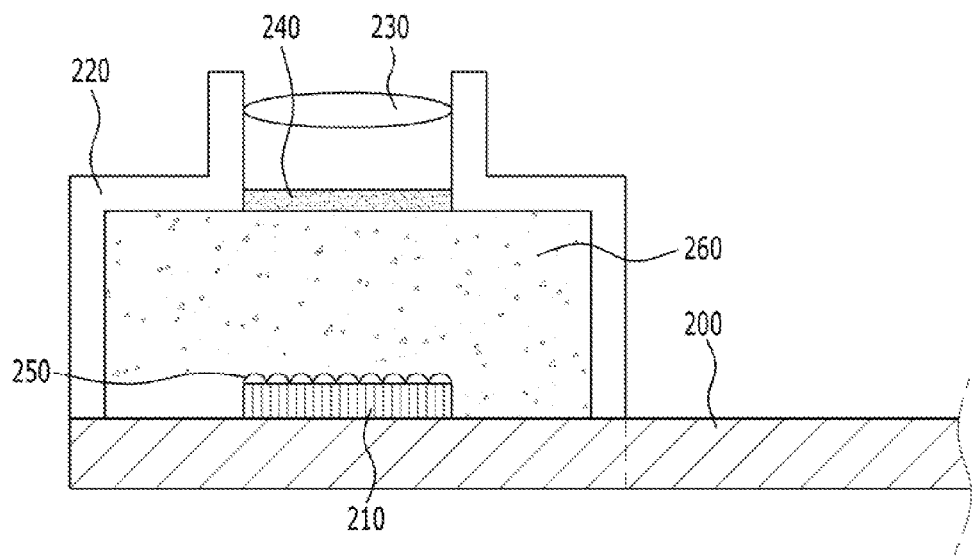
FIG. 2 is a block diagram illustrating an image sensor module in accordance with an embodiment of the present invention.

FIG. 2 is a block diagram illustrating an image sensor module in accordance with an embodiment of the present invention.

Referring to FIG. 2, the image sensor module may include a supporting substrate 200, an image sensor 210, a housing 220, a lens 230, a filter 240, and a filler 260 in the housing 220 that is sealed.

The image sensor 210 may be mounted on the supporting substrate 200 that may be a printed circuit board (PCB) or a flexible printed circuit board (FPCB). The supporting substrate 200 may include an electrical coupling means, for example a wire, for coupling elements of the image sensor 210 and the image sensor module (not illustrated in the drawings).

The image sensor 210 may include thereon a micro lens 250 for concentrating light and may convert a light signal including information on an image of a subject, and a distance and depth thereto into an electrical signal. For example, the image sensor 210 may be a charge coupled device (CCD) or a CMS image sensor (CIS).

The housing 220 may provide space for the supporting substrate 200, the image sensor 210, the lens 230, the filter 240, and the filler 260. The housing 220 may protect elements therein against a foreign object or an external shock.

The lens 230 may concentrate incident light, which comes to the image sensor module, on the image sensor 210. For example, the lens 230 may be a varifocal liquid crystal lens that uses a refractive index varying depending on changes in orientation of a liquid-crystal molecule. A focal length may be changed by controlling a voltage applied to both terminals of the lens.

The filter 240 may filter a particular waveband of the incident light coming to the image sensor 210. For example, the filter 240 may be an infrared (IR) cut-off filter for filtering infrared light.

The filler 260 may be a material of a low refractive index, induce vertical incidence of the incident light passing through the filter 240 and prevent a diffused reflection when the incident light reaches a surface of the image sensor 210. For example, the filler 260 may include an acrylic matching liquid and a fused silica matching liquid which have a low refractive index, i.e., a refractive index ranging from 1.2 to 1.4.

Also, the filler 260 may include a polymer of a low refractive index. The filler 260 may be easily manufactured with a liquid material.

Such a material of a low refractive index as described above may minimize a refractive index difference between the filter 240 and the image sensor 210.

For example, a general refractive index of the micro lens 250 ranges from 1.5 to 1.7 whereas a refractive index of air is 1.0. That is, a great refractive index difference between the micro lens 250 and air causes a great surface reflection. The surface reflection may cause the flare and the ghost image.

The filler 260 of an intermediate refractive index between the refractive indexes of the micro lens 250 and air may minimize the surface reflection. The refractive index of the filler 260 may be higher than that of air and lower than that of the filter 240.

The filler 260 filled in between the filter 240 and the image sensor 210 may induce vertical incidence of the incident light. The vertical incidence may raise incidence efficiency of the light, minimize the diffused reflection between the image sensor 210 and the filter 240 and thus prevent the flare.

Following is description of operations of the image sensor modules in accordance with an embodiment of the present invention and a comparative example.

Figure 3:
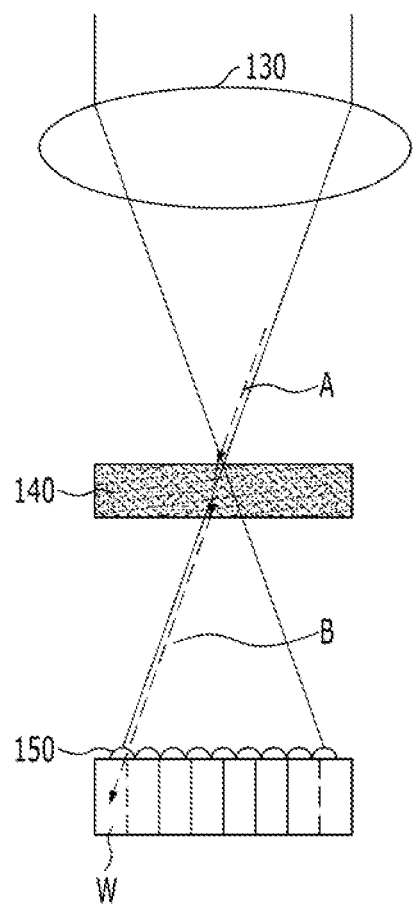
FIG. 3 is a diagram illustrating a path of incident light of the image sensor module according to a comparative example.
Figure 4:
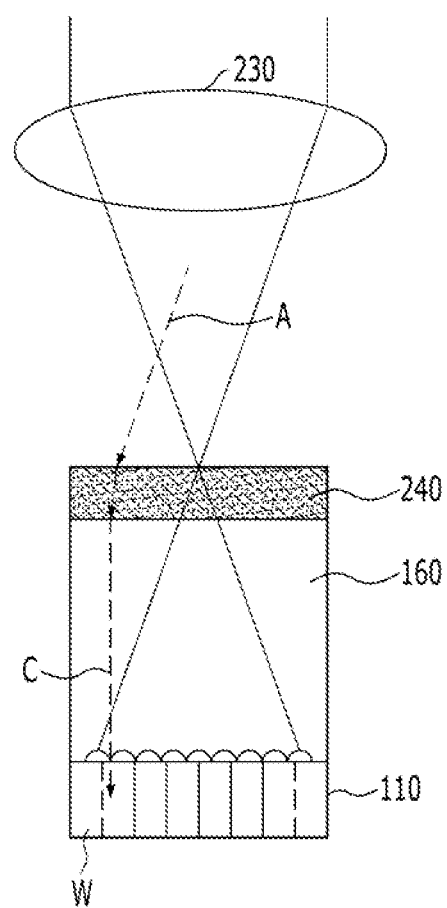
FIG. 4 is a diagram illustrating a path of incident light of the image sensor module in accordance with an embodiment of the present invention.

FIGS. 3 and 4 illustrate paths of the incident light coming to the image sensor modules and reaching the image sensors.

FIG. 3 is a diagram illustrating a path of the incident light of the image sensor module according to the comparative example.

Referring to FIG. 3, the incident light A passes through the filter 140 and becomes internal incident light B. The internal incident light B reaches the image sensor 110 by passing through air. The internal incident light B has an additional incident angle due to a refraction index difference between the filter 140 and air. The refraction indexes of air and the filter 140 are generally 1.0 and 1.55, respectively. Therefore the internal incident light B is apt to reach a side region W of the image sensor 110.

In accordance with an embodiment of the present invention, the filler 260 having a low refraction index is filled in between the filter 240 and the image sensor 210.

FIG. 4 is a diagram illustrating a path of the incident light of the image sensor module in accordance with an embodiment of the present invention.

Referring to FIG. 4, the incident light A may pass through the filter 240 and may become internal incident light. The internal incident light C reaches the image sensor 210 by passing through the filler 260. The filler 260 may have a refraction index ranging from 1.2 to 1.4 for example. A refraction index difference between the filler 260 and the filter 240 is less than a refraction index difference between air and the filter 140 and thus the filler 260 may induce vertical incidence of the incident light compared with the comparative example.

Therefore, the internal incident light C may be prevented from reaching a side region W of the image sensor 210.

Further, a refractive index difference between the micro lens 250 and the filler 260 in accordance with the embodiment of the present invention may be less that the refractive index difference between the micro lens 150 and air according to the comparative example, which may minimize an internal reflection that may occur when the internal incident light B reaches the micro lens 150.

Figure 5:
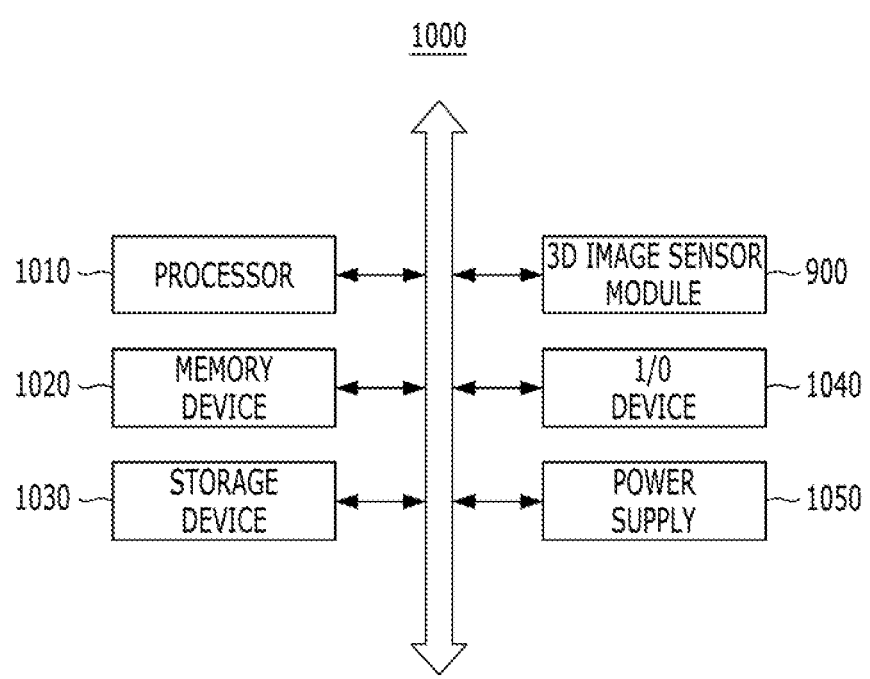
FIGS. 5 and 6 are block diagrams illustrating an image processing system including an image sensor module in accordance with an embodiment of the present invention.

FIG. 5 is a block diagram illustrating an image processing system including an image sensor module in accordance with an embodiment of the present invention.

Referring to FIG. 5, the image processing system 1000 may include a processor 1010, a memory device 1020, a storage device 1030, an input/output device 1040, a power supply device 1050 and an image sensor module 900.

The processor 1010 may perform particular operations and tasks. According to embodiments, the processor 1010 may be a microprocessor, a central processing unit (CPU). The processor 1010 may communicate with the memory device 1020, the storage device 1030 and the input/output device 1040 through an address bus, a control bus and a data bus. According to embodiments, the processor 1010 may be coupled to an expansion bus such as a peripheral component interconnect (PCI) bus.

The memory device 1020 may store data for operation of the image processing system 1000. For example, the memory device 1020 may be realized by a DRAM (dynamic random access memory), a mobile DRAM, an SRAM (static random access memory), a phase change random access memory (PRAM), a ferroelectric random access memory (FRAM), a resistive random access memory (RRAM), a spin transfer torque random access memory (STTRAM) and/or a magnetic random access memory (MRAM).

The storage device 1030 may include a solid state drive (SSD), a hard disk drive, a CD-ROM and so forth. The input/output device 1040 may include an input means such as a keyboard, a keypad, a mouse and so forth and an output means such as a printer, a display and so forth. The power supply device 1050 may provide an operating voltage for operation of the image processing system 1000.

The image sensor module 900 may be the image sensor module in accordance with the embodiment of the present invention. The image sensor module 900 may be coupled to and communicate with the processor 1010 through the buses or other communication links. The image sensor module 900 and the processor 1010 may be integrated together into one chip or separated into different chips.

Figure 6:
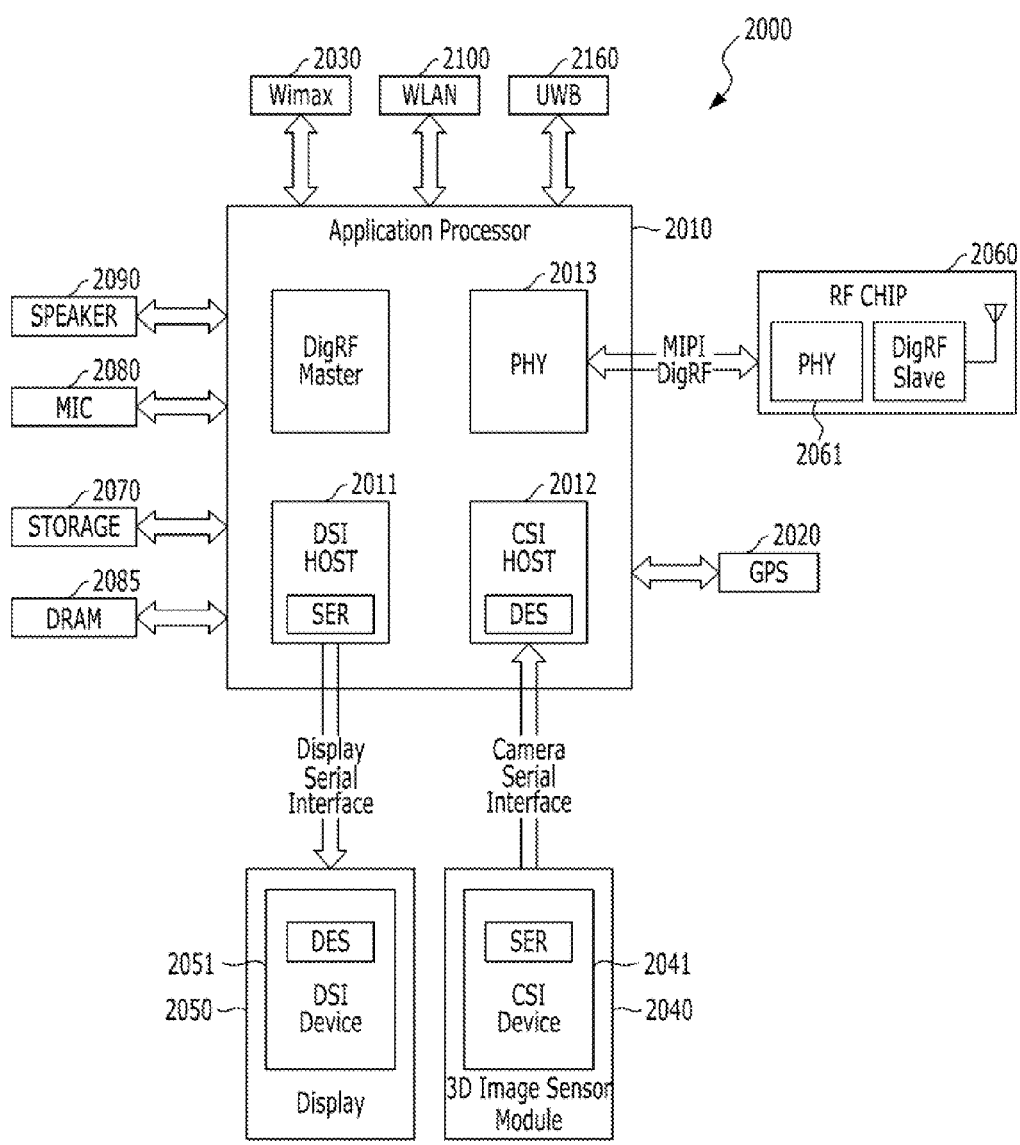

FIG. 6 is a block diagram illustrating an image processing system including an image sensor module in accordance with an embodiment of the present invention.

Referring to FIG. 6 the image processing system 2000 may be realized as a data processing apparatus using or supporting mobile industry processor interface (MIPI) such a mobile communication apparatus as a personal digital assistant (PDA), a mobile phone or a smart phone. The image processing system 2000 may be realized as a portable apparatus such as a tablet computer.

The image processing system 2000 may include an application processor 2010, an image sensor module 2040 and a display 2050.

A camera serial interface (CSI) host 2012 realized in the application processor 2010 may perform serial communication with CSI device 2041 of the image sensor module 2040 through a camera serial interface (CSI). The image sensor module 2040 may include the image sensor module in accordance with an embodiment of the present invention. A display serial interface (DSI) host 2011 realized in the application processor 2010 may perform serial communication with DSI device 2051 of the display 2050 through a display serial interface (DSI).

The image processing system 2000 may further include a radio frequency (RF) chip 2060 capable of performing communication with the application processor 2010. A physical layer (PHY) 2013 of the application processor 2010 and a physical layer (PHY) 2061 of the radio frequency (RF) chip 2060 may exchange data according to mobile industry processor interface (MIPI) digital radio frequency (DigRF).

The image processing system 2000 may further include a geographic positioning system (GPS) 2020, a data storage device 2070, a memory 2085 such as dynamic random access memory (DRAM) and a speaker 2090. The image processing system 2000 may perform communication through a worldwide interoperability for microwave access (Wimax) unit 2030, a wireless local area network (WLAN) unit 2100 and an ultra-wideband (UWB) unit 2160.

While the present invention has been described with respect to the specific embodiments, it will be apparent to those skilled in the art that various changes and modifications may be made without departing from the spirit and scope of the invention as defined in the following claims.

What is claimed is:

1. An image sensor module comprising:
an image sensor;
a housing covering the image sensor;
a filter coupled to the housing and disposed on the image sensor; and
a filler filled in between the image sensor and the filter in the housing and having a refractive index that is less than a refractive index of the filter;
wherein the refractive index of the filler is greater than a refractive index of air.

2. The image sensor module of claim 1, wherein the filler includes a liquid material.

3. The image sensor module of claim 1, wherein the filler includes an acrylic matching liquid or a fused silica matching liquid.

4. The image sensor module of claim 1, wherein the filter includes an infrared cut-off filter.

5. The image sensor module of claim 1, further comprising:
a lens coupled to the housing and disposed on the filter; and
a supporting substrate to which the image sensor is coupled.

6. The image sensor module of claim 1, wherein the image sensor includes a micro lens, and the refractive index of the filler is less than a refractive index of the micro lens.

7. An image processing system comprising:
an image sensor module;
a processor suitable for controlling an operation of the image sensor module;
a memory device suitable for storing data for the operation;
a storage device suitable for storing data for the operation and communication with an external device and retaining stored data regardless of a power supply;
an input/output device suitable for performing the communication with the external device;
a power supply device suitable for providing an operation voltage for the power supply,
wherein the image sensor module includes:
a filter suitable for filtering a light signal; and
an image sensor suitable for converting the filtered light signal into an electrical signal; and a filler disposed between the image sensor and the filter and having a refractive index lower than a refractive index of the filter.

8. An image sensor module comprising:
a lens suitable for concentrating a light signal;
a filter suitable for filtering the concentrated light signal; and
an image sensor suitable for converting the filtered light signal into an electrical signal; and
a filler filled in between the image sensor and the filter and having a refractive index lower than a refractive index of the filter;
wherein the refractive index of the filler is greater than a refractive index of air.

9. The image sensor module of claim 8, further comprising:
a housing sealing the image sensor and the filler with the filter.

* * * * *